United States Patent
Ikeda et al.

(10) Patent No.: US 11,927,239 B2
(45) Date of Patent: Mar. 12, 2024

(54) BALANCER STRUCTURE FOR INTERNAL COMBUSTION ENGINE, AND INTERNAL COMBUSTION ENGINE

(71) Applicant: TOYOTA JIDOSHA KABUSHIKI KAISHA, Toyota (JP)

(72) Inventors: Akihiro Ikeda, Nagoya (JP); Yoshitomo Mizuta, Toyota (JP); Hiroaki Ikegami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/176,575

(22) Filed: Mar. 1, 2023

(65) Prior Publication Data
US 2023/0332670 A1    Oct. 19, 2023

(30) Foreign Application Priority Data
Apr. 13, 2022   (JP) ................................. 2022-066161

(51) Int. Cl.
*F16F 15/26* (2006.01)
*F01M 1/02* (2006.01)

(52) U.S. Cl.
CPC .............. *F16F 15/265* (2013.01); *F01M 1/02* (2013.01); *F01M 2001/0276* (2013.01)

(58) Field of Classification Search
CPC . F16F 15/265; F01M 1/02; F01M 2001/0276; F01M 11/02
See application file for complete search history.

(56) References Cited

U.S. PATENT DOCUMENTS

| | | | |
|---|---|---|---|
| 2007/0289567 A1* | 12/2007 | Eto | F02B 75/32 123/192.1 |
| 2009/0133661 A1 | 5/2009 | Schober et al. | |
| 2009/0208352 A1* | 8/2009 | Shin | F04C 2/3442 417/365 |
| 2016/0258507 A1 | 9/2016 | Onigata | |
| 2018/0259035 A1 | 9/2018 | Bowler et al. | |
| 2020/0063612 A1* | 2/2020 | Matsuo | F01M 1/02 |

FOREIGN PATENT DOCUMENTS

| | | |
|---|---|---|
| DE | 20201006 U1 | 6/2003 |
| JP | 2016-161059 A | 9/2016 |

* cited by examiner

*Primary Examiner* — Syed O Hasan
(74) *Attorney, Agent, or Firm* — Oblon, McClelland, Maier & Neustadt, L.L.P.

(57) ABSTRACT

A balancer structure for an internal combustion engine and the internal combustion engine are provided. A transmission driving gear are arranged to be rotatable integrally with a crankshaft. A transmission driven gear is arranged to be rotatable integrally with a first balance shaft. The transmission driven gear meshes with the transmission driving gear. A balancer driving gear is arranged to be rotatable integrally with the first balance shaft. A balancer driven gear is arranged to be rotatable integrally with the second balance shaft. The balancer driven gear meshes with the balancer driving gear. The first balance shaft includes an output portion. The output portion outputs torque to an engine-driven accessory.

5 Claims, 3 Drawing Sheets

BALANCER STRUCTURE FOR INTERNAL COMBUSTION ENGINE, AND INTERNAL COMBUSTION ENGINE

BACKGROUND

1. Field

The present disclosure relates to a balancer structure for an internal combustion engine and to the internal combustion engine.

2. Description of Related Art

Japanese Laid-Open Patent Publication No. 2016-161059 discloses a balancer structure for an internal combustion engine. The internal combustion engine includes a driving balance shaft and a driven balance shaft that extends in a direction along a crankshaft. In the balancer structure, the driving balance shaft rotates when receiving a driving torque from the crankshaft. The driven balance shaft rotates when receiving the driving torque from the driving balance shaft.

Specifically, the balancer structure further includes a balancer driving gear that rotates integrally with the driving balance shaft and a balancer driven gear that rotates integrally with the driven balance shaft. The balancer driven gear meshes with the balancer driving gear.

In the balancer structure, the driven balance shaft is coupled to an oil pump by a driving mechanism.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A balancer structure for an internal combustion engine according to an aspect of the present disclosure includes a first balance shaft that extends in a direction along a crankshaft of the internal combustion engine and a second balance shaft that extends in the direction along the crankshaft. The balancer structure further includes a first balancer weight arranged to be rotatable integrally with the first balance shaft and a second balancer weight arranged to be rotatable integrally with the second balance shaft. The balancer structure further includes a transmission driving gear arranged to be rotatable integrally with the crankshaft and a transmission driven gear arranged to be rotatable integrally with the first balance shaft, the transmission driven gear meshing with the transmission driving gear. The balancer structure further includes a balancer driving gear arranged to be rotatable integrally with the first balance shaft and a balancer driven gear arranged to be rotatable integrally with the second balance shaft, the balancer driven gear meshing with the balancer driving gear. The balancer structure further includes an output portion arranged on the first balance shaft, the output portion outputting torque to an engine-driven accessory.

In the balancer structure, the engine-driven accessory is coupled to the first balance shaft by the output portion. Thus, instead of the second balance shaft, the first balance shaft receives the load produced when the accessory is driven. This reduces the load on the second balance shaft, which is one of the first and second balance shafts that is to be rotated. Accordingly, when the first and second balance shafts rotate as the crankshaft rotates, the deformation of the balancer driven gear is limited even when the teeth of the balancer driving gear respectively push the teeth of the balancer driven gear. As the deformation degree of the balancer driven gear becomes smaller, the meshing sound resulting from the deformation of the balancer driven gear is less likely to occur. Hence, the balancer structure limits situations in which the meshing sound resulting from the deformation of the balancer driven gear is produced between the balancer driven gear and the balancer driving gear.

In a configuration in which an oil pump is coupled to the driven balance shaft, the oil pump acts as load on the driven balance shaft. Thus, when the two balance shafts are rotating, the teeth of the balancer driving gear respectively push the balancer driven gear to deform the teeth of the balancer driven gear on the driven balance shaft. In this case, as the load on the oil pump becomes larger, the deformation degree of the balancer driven gear becomes larger. When the deformed balancer driven gear returns to its original shape, a meshing sound (noise) is produced between the balancer driving gear and the balancer driven gear. As the driving torque transmitted from the driving balance shaft to the driven balance shaft becomes larger, the meshing sound becomes larger. The above balancer structure reduces such a noise.

In an aspect of the balancer structure, a diameter of the balancer driving gear and a diameter of the balancer driven gear are smaller than a diameter of the transmission driving gear.

When the rotation speed of the crankshaft fluctuates, fluctuations also occur in the rotation speed of the first balance shaft, which rotates as the crankshaft rotates. When the rotation speed of the first balance shaft fluctuates, a rattling sound may be produced between the balancer driving gear and the balancer driven gear. To solve this problem, in the balancer structure, the diameter of the balancer driving gear and the diameter of the balancer driven gear are smaller than the diameter of the transmission driving gear. This limits situations in which the rattling sound is produced between the balancer driving gear and the balancer driven gear.

In an aspect of the balancer structure, the balancer driving gear is arranged such that the transmission driven gear is located between the balancer driving gear and the output portion in a direction in which the first balance shaft extends.

In the balancer structure, for example, in the direction in which the first balance shaft extends, the first balance shaft is longer than when the balancer driving gear is located between the output portion and the transmission driven gear. This reduces the diameter of the first balancer weight on the first balance shaft and increases the length of the first balance shaft in the extending direction of the first balance shaft. That is, the above configuration reduces the diameter of the first balancer weight and increases the inertia of the first balancer weight. This increases the effect of limiting situations in which a rattling sound is produced between the balancer driving gear and the balancer driven gear.

In an example of the balancer structure, when the accessory is an oil pump, the first balance shaft outputs torque to the oil pump through the output portion.

Another aspect of the present disclosure provides an internal combustion engine. The internal combustion engine includes a crankshaft, a first balance shaft that extends in a direction along the crankshaft, and a second balance shaft that extends in the direction along the crankshaft. The internal combustion engine further includes a first balancer weight arranged to be rotatable integrally with the first balance shaft and a second balancer weight arranged to be rotatable integrally with the second balance shaft. The internal combustion engine further includes a transmission driving gear arranged to be rotatable integrally with the crankshaft and a transmission driven gear arranged to be rotatable integrally with the first balance shaft, the transmission driven gear meshing with the transmission driving gear. The internal combustion engine further includes a balancer driving gear arranged to be rotatable integrally with the first balance shaft, a balancer driven gear arranged to be rotatable integrally with the second balance shaft, the balancer driven gear meshing with the balancer driving gear. The internal combustion engine further includes an output portion arranged on the first balance shaft, the output portion outputting torque to an engine-driven accessory.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A balancer structure for an internal combustion engine 10 will now be described with reference to FIGS. 1 to 4. Hereinafter, the balancer structure for the internal combustion engine 10 will be simply referred to as the balancer structure.

Figure 1:
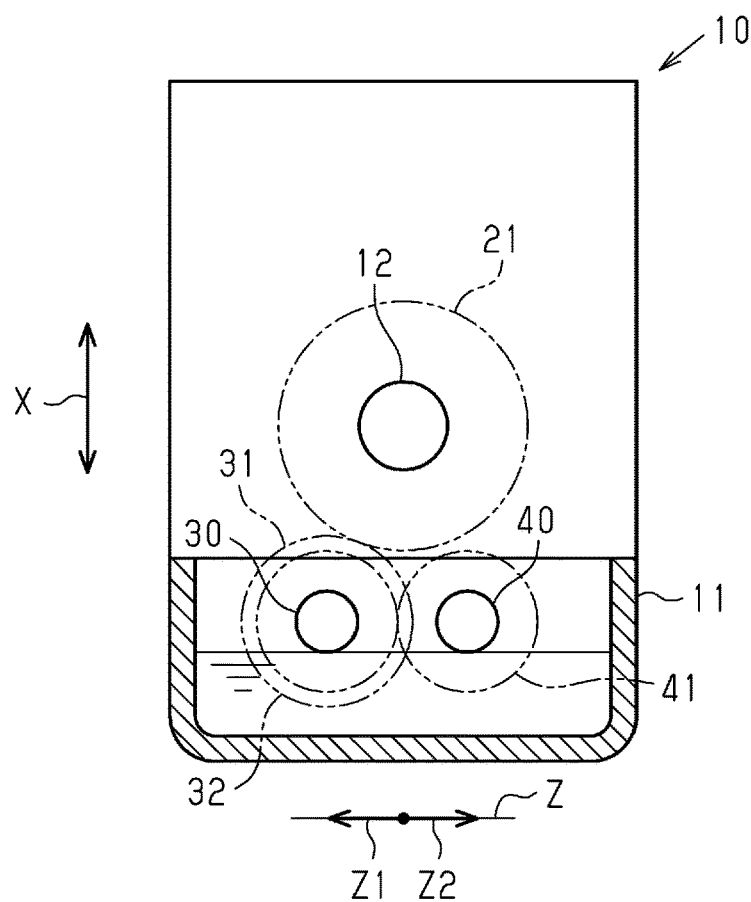
FIG. 1 is a diagram of an internal combustion engine that includes a balancer structure according to a first embodiment.

FIG. 1 shows the internal combustion engine 10 including the balancer structure of the present embodiment. The internal combustion engine 10 of FIG. 1 is a straight-four internal combustion engine. The internal combustion engine 10 includes an oil pan 11 and a crankshaft 12. The oil pan 11 defines a lower part of the internal combustion engine 10. The oil pan 11 stores oil that circulates in the internal combustion engine 10. The crankshaft 12 is an output shaft of the internal combustion engine 10, and is located above the oil pan 11.

Balancer Structure

The configuration of the balancer structure will now be described with reference to FIGS. 1 and 2.

As shown in FIG. 1, the balancer structure includes a first balance shaft 30 and a second balance shaft 40 that extend in a direction along the crankshaft 12. When it is described in this specification that A extends along B, or other variants thereof, A is substantially parallel to B, and A may be slightly inclined relative to B due to, for example, manufacturing errors.

The first balance shaft 30 and the second balance shaft 40 are located below the crankshaft 12. Specifically, the first balance shaft 30 and the second balance shaft 40 are arranged in the oil pan 11. The direction corresponding to an axis Z that is orthogonal to an up-down direction X of the internal combustion engine 10 and the extending direction of the crankshaft 12 is referred to as a first horizontal direction Z1. The direction opposite of the first horizontal direction Z1 is referred to as a second horizontal direction Z2. In this case, the first balance shaft 30 is separated from the crankshaft 12 in the first horizontal direction Z1. The second balance shaft 40 is separated from the crankshaft 12 in the second horizontal direction Z2. FIG. 1, the first horizontal direction Z1 is oriented toward the left, and the second horizontal direction Z2 is oriented toward the right.

Figure 2:
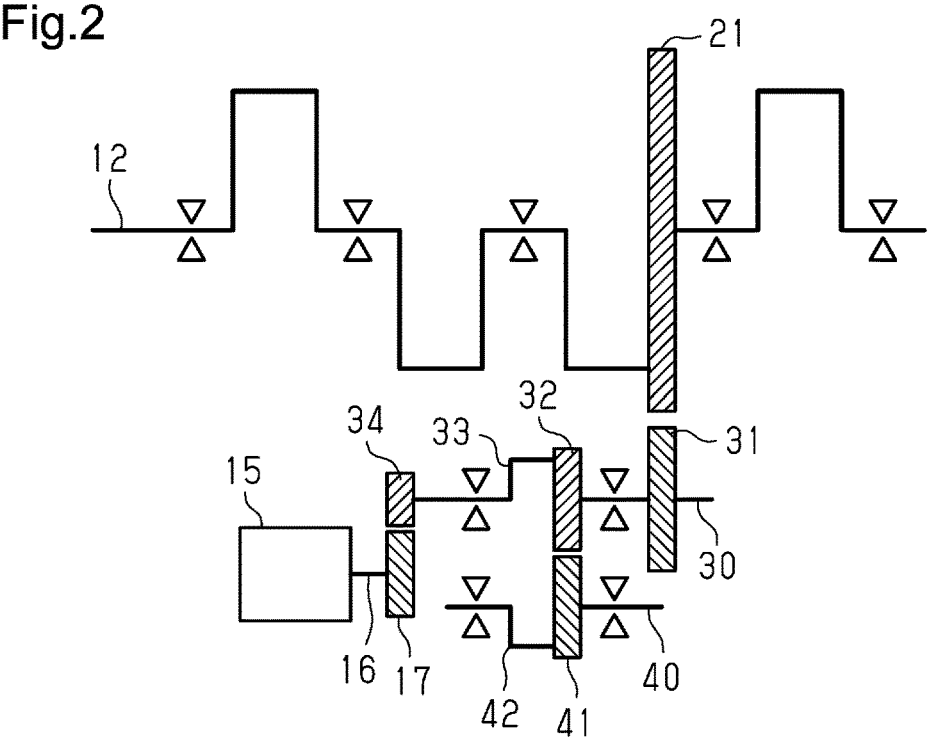
FIG. 2 is a schematic diagram of the balancer structure in the first embodiment shown in FIG. 1.

As shown in FIGS. 1 and 2, the balancer structure includes a transmission driving gear 21 and a transmission driven gear 31. The transmission driving gear 21 is arranged to be rotatable integrally with the crankshaft 12. The transmission driven gear 31 is arranged to be rotatable integrally with the first balance shaft 30. The transmission driven gear 31 meshes with the transmission driving gear 21. As the crankshaft 12 rotates, the first balance shaft 30 receives torque from the crankshaft 12 through the transmission driving gear 21 and the transmission driven gear 31. This rotates the first balance shaft 30.

The balancer structure includes a balancer driving gear 32 and a balancer driven gear 41. The diameter of the balancer driving gear 32 and the diameter of the balancer driven gear 41 are smaller than the diameter of the transmission driving gear 21.

The balancer driving gear 32 is arranged to be rotatable integrally with the first balance shaft 30. The balancer driven gear 41 is arranged to be rotatable integrally with the second balance shaft 40. The balancer driven gear 41 meshes with the balancer driving gear 32. As the first balance shaft 30 rotates, the second balance shaft 40 receives torque from the first balance shaft 30 through the balancer driving gear 32 and the balancer driven gear 41. This rotates the second balance shaft 40. The rotation direction of the second balance shaft 40 is the opposite of the rotation direction of the first balance shaft 30. Additionally, the rotation speed of the second balance shaft 40 is equal to the rotation speed of the first balance shaft 30.

The balancer structure includes a first balancer weight 33 and a second balancer weight 42. The first balancer weight 33 is arranged to be rotatable integrally with the first balance shaft 30. The second balancer weight 42 is arranged to be rotatable integrally with the second balance shaft 40. As described above, the rotation direction of the second balance shaft 40 is the opposite of the rotation direction of the first balance shaft 30. Thus, the first balancer weight 33 and the second balancer weight 42 rotate in opposite directions to cancel out centrifugal forces produced by the first balance shaft 30 and the second balance shaft 40. This prevents the occurrence of secondary vibration in the internal combustion engine 10.

The internal combustion engine 10 includes an oil pump 15 as an engine-driven accessory. In the present embodiment, the oil pump 15 receives a driving torque from the first balance shaft 30. That is, an output gear 34 is arranged to be rotatable integrally with the first balance shaft 30. The output gear 34 corresponds to an output portion. The balancer driving gear 32 is located between the output gear 34 and the transmission driven gear 31. The output gear 34 is located at an end of the first balance shaft 30 opposite from the transmission driven gear 31. An input gear 17 is arranged to be rotatable integrally with the driving shaft 16 of the oil pump 15. The input gear 17 meshes with the output gear 34. Thus, as the first balance shaft 30 rotates, the oil pump 15 receives torque from the first balance shaft 30 through the output gear 34 and the input gear 17. This drives the oil pump 15.

Operation and Advantages of Present Embodiment

Figure 3:
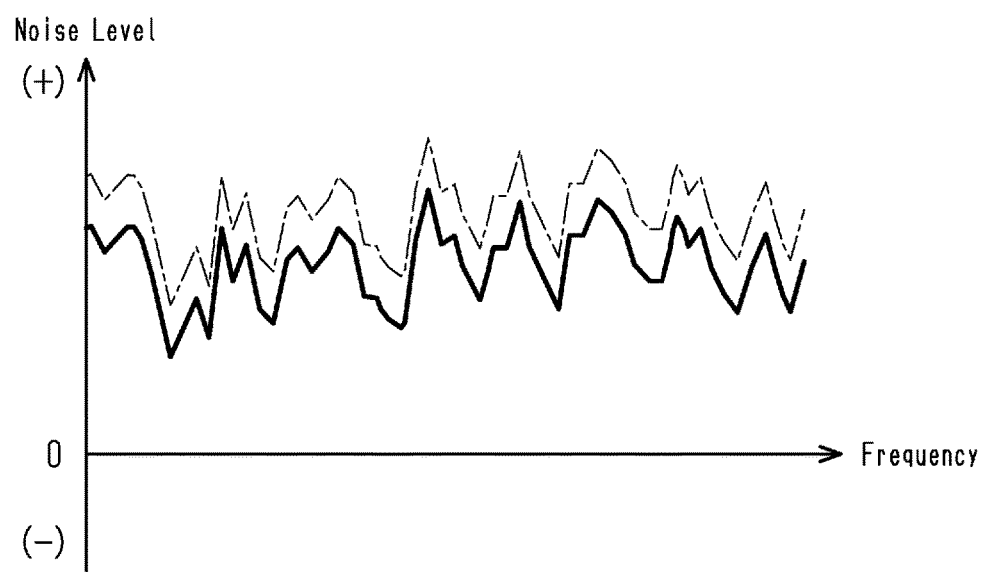
FIG. 3 is a graph showing the difference in the noise level of a meshing sound between the balancer structure of the first embodiment, which is shown in FIG. 2, and a balancer structure of a comparative example.

The operation of the present embodiment will now be described with reference to FIG. 3. A meshing sound is produced between the balancer driving gear 32 and the balancer driven gear 41. FIG. 3 shows the relationship between the noise level of the meshing sound produced between the balancer driving gear 32 and the balancer driven gear 41 and the frequency of the meshing sound. In FIG. 3, the solid line shows the relationship between the noise level and frequency of the meshing sound produced in the balancer structure of the present embodiment. The broken line shows the relationship between the noise level and frequency of the meshing sound produced in a balancer structure of a comparative example.

In the balancer structure of the comparative example, the output gear 34 is arranged on the second balance shaft 40, not on the first balance shaft 30. In this respect, the balancer structure of the comparative example is different from that of the present embodiment. The components included in the balancer structure of the comparative example other than the output gear 34 are similar to those included in the balancer structure of the present embodiment.

As shown in FIG. 3, the noise level of the meshing sound produced between the balancer driving gear 32 and the balancer driven gear 41 is lower in the balancer structure of the present embodiment than in the balancer structure of the comparative example. The reason will be described below.

In the present embodiment and the comparative example, when the first balance shaft 30 and the second balance shaft 40 rotate as the crankshaft 12 rotates, the teeth of the balancer driving gear 32 respectively push the teeth of the balancer driven gear 41, thereby deforming the balancer driven gear 41. When the deformed balancer driven gear 41 returns to its original shape, the meshing sound is produced between the balancer driving gear 32 and the balancer driven gear 41. In the balancer structure of the comparative example, the oil pump 15 is coupled to the second balance shaft 40. In this case, the second balance shaft 40 receives the load produced when the oil pump 15 is driven. The load acts on the second balance shaft 40 as a force that limits the rotation of the second balance shaft 40. Thus, in the comparative example, the degree of deforming the balancer driven gear 41 is likely to be relatively large when the balancer driving gear 32 pushes the balancer driven gear 41. As the degree of deforming the balancer driven gear 41 becomes larger, the noise level of the meshing sound is likely to become higher.

In the balancer structure of the present embodiment, the oil pump 15 is coupled to the first balance shaft 30, not to the second balance shaft 40. Thus, instead of the second balance shaft 40, the first balance shaft 30 receives the load produced when the oil pump 15 is driven. Consequently, as compared to the balancer structure of the comparative example, the force that limits the rotation of the second balance shaft 40 is reduced. Therefore, the degree of deforming the balancer driven gear 41 when the balancer driving gear 32 pushes the balancer driven gear 41 is less likely to increase in the balancer structure of the present embodiment than in that of the comparative example. Accordingly, the noise level of the meshing sound produced between the balancer driving gear 32 and the balancer driven gear 41 is smaller in the balancer structure of the present embodiment than in that of the comparative example.

Hence, the balancer structure of the present embodiment limits the production of the meshing sound between the balancer driven gear 41 and the balancer driving gear 32 resulting from the deformation of the balancer driven gear 41.

Figure 4:
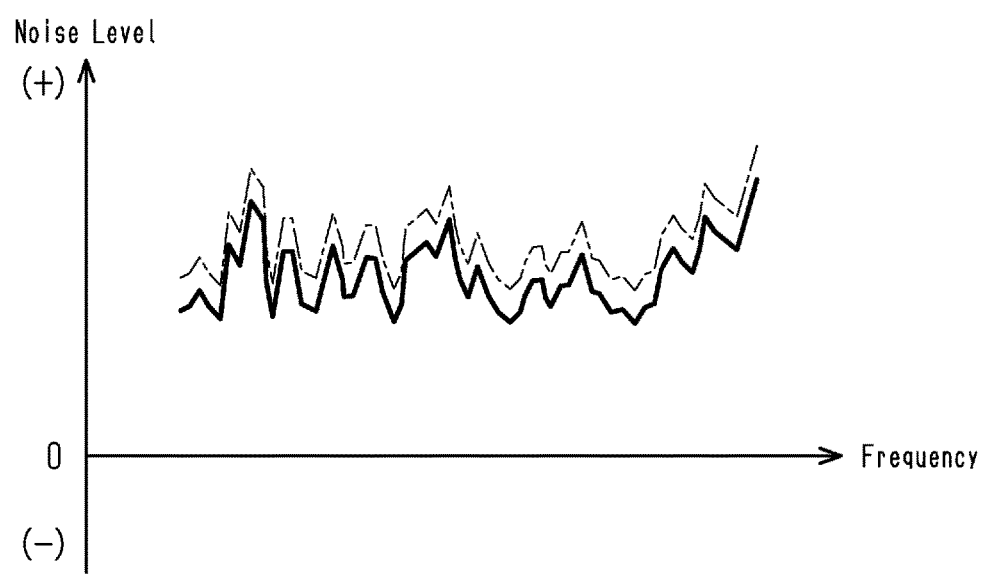
FIG. 4 is a graph showing the difference in the noise level of a rattling sound between the balancer structure in the first embodiment, which is shown in FIG. 2, and the balancer structure in the comparative example.

FIG. 4 shows the relationship between the noise level of a rattling sound produced between the transmission driving gear 21 and the transmission driven gear 31 and the frequency of the rattling sound. In FIG. 4, the solid line shows the relationship between the noise level and frequency of the rattling sound produced in the balancer structure of the present embodiment. The broken line shows the relationship between the noise level and frequency of the rattling sound produced in the balancer structure of the comparative example. As shown in FIG. 4, the noise level of the rattling sound produced between the transmission driving gear 21 and the transmission driven gear 31 is lower in the balancer structure of the present embodiment than in the balancer structure of the comparative example.

The present embodiment further achieves the following advantage.

(1-1) In the internal combustion engine 10, the crankshaft 12 is rotated by the force produced by burning air-fuel mixture in cylinders. Thus, the rotation speed of the crankshaft 12 fluctuates. When the rotation speed of the crankshaft 12 fluctuates, fluctuations also occur in the rotation speed of the first balance shaft 30, which rotates as the crankshaft 12 rotates. When the rotation speed of the first balance shaft 30 fluctuates, variations occur in the rotation speed of the balancer driving gear 32 relative to that of the balancer driven gear 41. This causes the teeth of the balancer driving gear 32 to come into contact with and separate from those of the balancer driven gear 41. Thus, a rattling sound may be produced between the balancer driving gear 32 and the balancer driven gear 41.

In the balancer structure of the present embodiment, the diameters of the balancer driving gear 32 and the balancer driven gear 41 are smaller than the diameter of the transmission driving gear 21. This limits the production of the rattling sound between the balancer driving gear 32 and the balancer driven gear 41.

The balancer structure according to a second embodiment will now be described with reference to FIG. 5. The differences from the first embodiment will mainly be described below. Like or the same reference numerals are given to those components that are the same as the corresponding components of the first embodiment. Such components will not be described.

Figure 5:
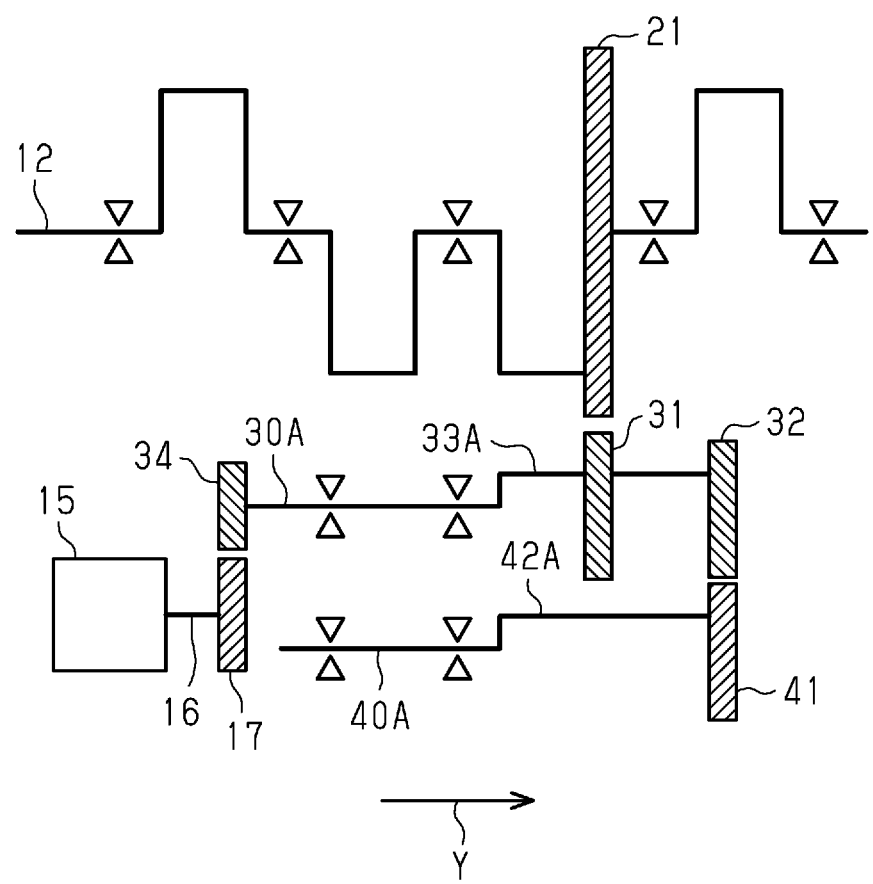
FIG. 5 is a schematic diagram of the balancer structure according to a second embodiment.

As shown in FIG. 5, the balancer structure of the present embodiment includes a first balance shaft 30A and a second balance shaft 40A that extend in the direction along the crankshaft 12. The balancer structure of the present embodiment is different from that of the first embodiment in the arrangement of the gears 31, 32, 34 of the first balance shaft. The direction in which the first balance shaft 30A extends is referred to as a shaft extending direction Y. In this case, the balancer driving gear 32 is arranged such that the transmission driven gear 31 is located between the balancer driving gear 32 and the output gear 34.

Because of such a change in the arrangement of the gears 31, 32, 34, the first balance shaft 30A is longer than the first balance shaft 30 of the first embodiment. This allows the first balancer weight 33A to have a smaller diameter and a longer dimension in the shaft extending direction Y than the first balancer weight 33 of the first embodiment.

Additionally, the second balance shaft 40A of the present embodiment is longer than the second balance shaft 40 of the first embodiment. This allows the second balancer weight 42A to have a smaller diameter and a longer dimension in the shaft extending direction Y than the second balancer weight 42 of the first embodiment.

Specifically, the present embodiment reduces the diameters of the first balancer weight 33 and the second balancer weight 42A and increases the inertia of the first balancer weight 33A and the second balancer weight 42A.

Accordingly, the present embodiment achieves the following advantage in addition to the advantage of the first embodiment.

(2-1) In the balancer structure of the present embodiment, the diameter of the first balancer weight 33A is smaller in the shaft extending direction Y than in the configuration in which the balancer driving gear 32 is located between the output gear 34 and the transmission driven gear 31. Further, the length of the first balancer weight 33A in the shaft extending direction Y is longer. That is, the present embodiment reduces the diameter of the first balancer weight 33A and increases the inertia of the first balancer weight 33A. Further, the present embodiment reduces the diameter of the second balancer weight 42A and increases the inertia of the second balancer weight 42A. This increases the effect of limiting the production of the rattling sound between the balancer driving gear 32 and the balancer driven gear 41.

Modifications

The above embodiments may be modified as follows. The above embodiments and the following modifications can be combined as long as the combined modifications remain technically consistent with each other.

The gears 31, 32, 34 of the first balance shaft 30, 30A do not have to be arranged in the manner of the above embodiments.

The engine-driven accessory coupled to the first balance shaft 30, 30A by the output portion is not limited to the oil pump 15.

The diameter of the balancer driving gear 32 and the diameter of the balancer driven gear 41 do not have to be smaller than the diameter of the transmission driving gear 21.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A balancer structure for an internal combustion engine, the balancer structure comprising:
   a first balance shaft that extends in a direction along a crankshaft of the internal combustion engine;
   a second balance shaft that extends in the direction along the crankshaft;
   a first balancer weight arranged to be rotatable integrally with the first balance shaft;
   a second balancer weight arranged to be rotatable integrally with the second balance shaft;
   a transmission driving gear arranged to be rotatable integrally with the crankshaft;
   a transmission driven gear arranged to be rotatable integrally with the first balance shaft, the transmission driven gear meshing with the transmission driving gear;
   a balancer driving gear arranged to be rotatable integrally with the first balance shaft;
   a balancer driven gear arranged to be rotatable integrally with the second balance shaft, the balancer driven gear meshing with the balancer driving gear; and
   an output portion arranged on the first balance shaft, the output portion outputting torque to an engine-driven accessory.

2. The balancer structure for the internal combustion engine according to claim 1, wherein a diameter of the balancer driving gear and a diameter of the balancer driven gear are smaller than a diameter of the transmission driving gear.

3. The balancer structure for the internal combustion engine according to claim 2, wherein the balancer driving gear is arranged such that the transmission driven gear is located between the balancer driving gear and the output portion in a direction in which the first balance shaft extends.

4. The balancer structure for the internal combustion engine according to claim 1, wherein
   the accessory is an oil pump, and
   the first balance shaft outputs torque to the oil pump through the output portion.

5. An internal combustion engine, comprising:
   a crankshaft;
   a first balance shaft that extends in a direction along the crankshaft;
   a second balance shaft that extends in the direction along the crankshaft;
   a first balancer weight arranged to be rotatable integrally with the first balance shaft;
   a second balancer weight arranged to be rotatable integrally with the second balance shaft;
   a transmission driving gear arranged to be rotatable integrally with the crankshaft;
   a transmission driven gear arranged to be rotatable integrally with the first balance shaft, the transmission driven gear meshing with the transmission driving gear;
   a balancer driving gear arranged to be rotatable integrally with the first balance shaft;

a balancer driven gear arranged to be rotatable integrally with the second balance shaft, the balancer driven gear meshing with the balancer driving gear; and an output portion arranged on the first balance shaft, the output portion outputting torque to an engine-driven accessory.

\* \* \* \* \*